(12) United States Patent
Hitotsuya et al.

(10) Patent No.: US 12,185,228 B2
(45) Date of Patent: Dec. 31, 2024

(54) INFORMATION PROCESSING METHOD, RECORDING MEDIUM, ELECTRONIC DEVICE, INFORMATION PROCESSING SYSTEM, AND TERMINAL DEVICE

(71) Applicant: Panasonic Intellectual Property Management Co., Ltd., Osaka (JP)

(72) Inventors: Masashi Hitotsuya, Osaka (JP); Tomohiro Maeda, Osaka (JP); Kento Ogawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 324 days.

(21) Appl. No.: 17/745,350

(22) Filed: May 16, 2022

(65) Prior Publication Data

US 2022/0386223 A1 Dec. 1, 2022

(30) Foreign Application Priority Data

May 28, 2021 (JP) .................................. 2021-090116
Dec. 23, 2021 (JP) .................................. 2021-209701

(51) Int. Cl.
*H04W 48/16* (2009.01)
*H04W 48/20* (2009.01)
*H04W 76/10* (2018.01)
*H04W 88/06* (2009.01)

(52) U.S. Cl.
CPC ........... *H04W 48/16* (2013.01); *H04W 48/20* (2013.01); *H04W 76/10* (2018.02); *H04W 88/06* (2013.01)

(58) Field of Classification Search
None
See application file for complete search history.

(56) References Cited

U.S. PATENT DOCUMENTS

| 2003/0091015 | A1 | 5/2003 | Gassho et al. | |
|---|---|---|---|---|
| 2016/0295628 | A1* | 10/2016 | Allanki | ................. H04W 48/08 |
| 2019/0097830 | A1* | 3/2019 | Ha | ...................... H04L 12/2816 |
| 2019/0239110 | A1* | 8/2019 | Hegde | ............... H04W 28/0236 |
| 2020/0100171 | A1* | 3/2020 | Uchikawa | ............. H04W 84/12 |

(Continued)

FOREIGN PATENT DOCUMENTS

JP 2003-143156 A 5/2003

*Primary Examiner* — Christopher M Crutchfield
(74) *Attorney, Agent, or Firm* — Rimon P.C.

(57) ABSTRACT

An information processing method includes a presenting step, an obtaining step, and a connecting step. The presenting step is a step of presenting candidate information regarding candidates for an access point to a user via a terminal device communicable with an electronic device. Each of the candidate has a communication standard to which the electronic device conforms. The obtaining step is a step of obtaining, from the terminal device, connection information to be used in wireless communication connection with an access point corresponding to one connection destination candidate selected by the user using the terminal device from connection destination candidates based on the candidate information. The connecting step is a step of establishing the wireless communication connection with the access point corresponding to the one connection destination candidate with reference to the connection information obtained at the obtaining step.

8 Claims, 6 Drawing Sheets

(56) References Cited

U.S. PATENT DOCUMENTS

2020/0120235 A1\* 4/2020 Ando ................... G06F 3/1292
2020/0196358 A1\* 6/2020 Kim ..................... H04W 48/16
2023/0068641 A1\* 3/2023 Lu ...................... H04L 12/2809

\* cited by examiner

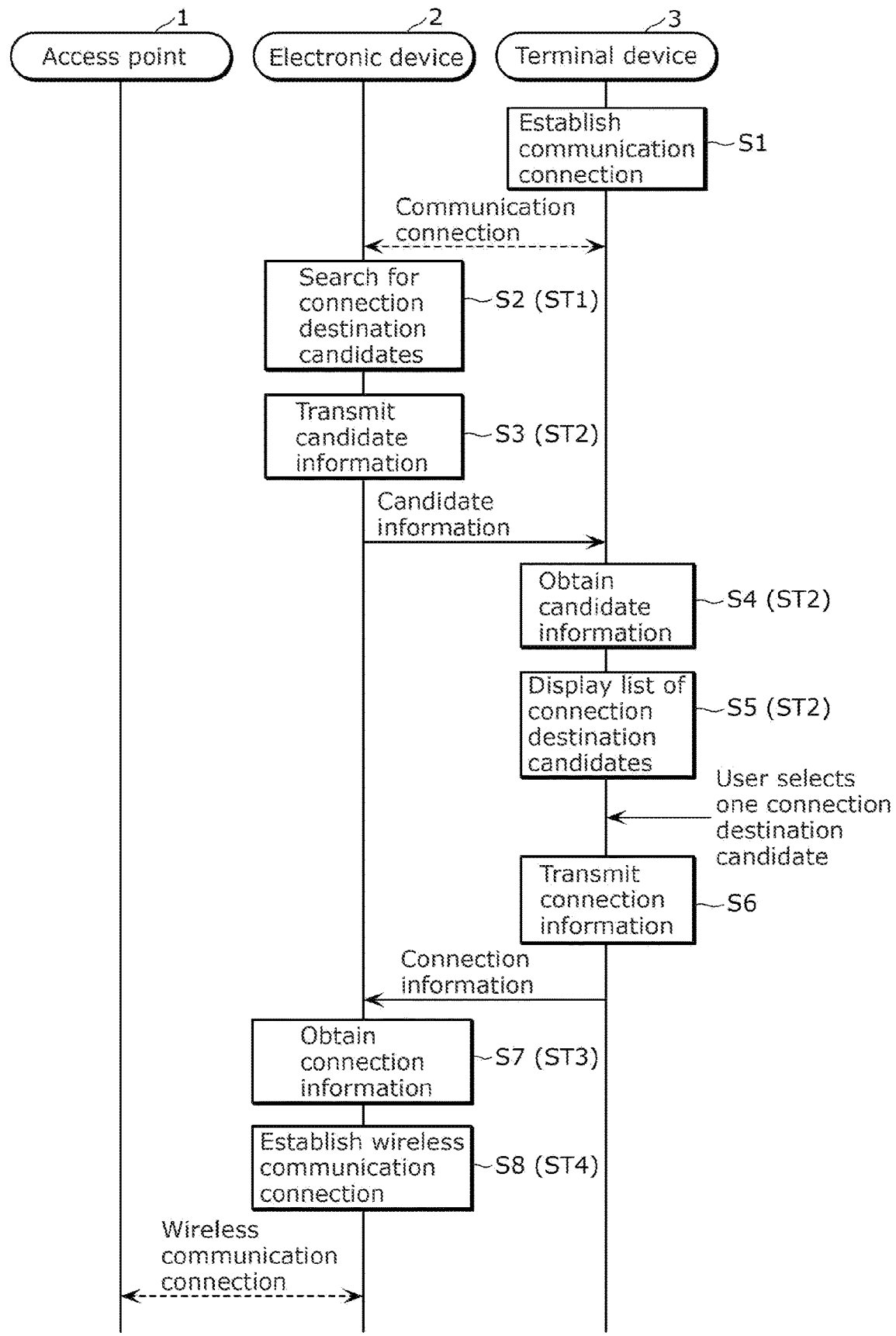

INFORMATION PROCESSING METHOD, RECORDING MEDIUM, ELECTRONIC DEVICE, INFORMATION PROCESSING SYSTEM, AND TERMINAL DEVICE

CROSS REFERENCE TO RELATED APPLICATIONS

The present application is based on and claims priority of Japanese Patent Application No. 2021-090116 filed on May 28, 2021, and Japanese Patent Application No. 2021-209701 filed on Dec. 23, 2021. The entire disclosure of the above-identified application, including the specification, drawings and claims is incorporated herein by reference in its entirety.

FIELD

The present disclosure relates to an information processing method, a recording medium, an electronic device, an information processing system, and a terminal device, for connecting the electronic device to an external network.

BACKGROUND

PTL 1 discloses a process for connecting a device not including a plenty of input interfaces, such as a print device, to a wireless local area network (LAN).

CITATION LIST

Patent Literature

PTL 1: Japanese Unexamined Patent Application Publication No. 2003-143156

SUMMARY

Technical Problem

The present disclosure provides an information processing method and the like for more easily connecting an electronic device to an external network without the occurrence of an event that gives a feeling of discomfort to a user, such as an error.

Solution to Problem

In accordance with an aspect of the present disclosure, an information processing method of connecting an electronic device to an external network by establishing wireless communication connection between the electronic device and an access point connected to the external network includes: presenting candidate information regarding one or more candidates for the access point to a user via a terminal device communicable with the electronic device, the one or more candidates each having a communication standard to which the electronic device conforms; obtaining, from the terminal device, connection information to be used in wireless communication connection with an access point corresponding to one connection destination candidate selected by the user using the terminal device from one or more connection destination candidates based on the candidate information; and establishing the wireless communication connection with the access point corresponding to the one connection destination candidate with reference to the connection information obtained in the obtaining.

In accordance with another aspect of the present disclosure, a non-transitory computer-readable recording medium has recorded thereon a program for causing one or more processors to execute the above-described information processing method.

In accordance with still another aspect of the present disclosure, an electronic device to be connected with an external network by establishing wireless communication connection with an access point connected to the external network includes: an outputter that outputs candidate information regarding one or more candidates for the access point to a terminal device with which the electronic device is communicable, the one or more candidates each having a communication standard to which the electronic device conforms; an obtainer that obtains, from the terminal device, connection information to be used in wireless communication connection with the access point corresponding to one connection destination candidate selected by the user using the terminal device from one or more connection destination candidates based on the candidate information; and a connector that establishes the wireless communication connection with the access point corresponding to the one connection destination candidate with reference to the connection information obtained by the obtainer.

In accordance with still another aspect of the present disclosure, an information processing system includes: the above-described electronic device; and the terminal device including a communicator that communicates with the electronic device.

In accordance with still another aspect of the present disclosure, a terminal device includes: a communicator that communicates with the above-described electronic device; a presenter that presents the candidate information obtained from the electronic device; an input receiver that receives an input of the user for selecting the one connection destination candidate; and a processor that transmits the connection information to the electronic device via the communicator, the connection information being used in wireless communication connection with the access point corresponding to the one connection destination candidate received by the input receiver, wherein when another device different from the electronic device has already established wireless communication connection with an access point, the presenter preferentially presents a connection destination candidate corresponding to the access point.

Advantageous Effects

According to the information processing method and the like in the present disclosure, there is an advantage that an electronic device is more easily connected to an external network without the occurrence of an event that gives a feeling of discomfort to a user, such as an error.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 5 is a sequence diagram illustrating a behavior example of the information processing system in Embodiment.

DESCRIPTION OF EMBODIMENT (Finding that Forms the Basis for the Present Disclosure)

First, viewpoints of the present inventor are described below.

Up to now, like a so-called Internet of Things (IoT) device, an electronic device connectable to an external network such as the Internet has been known. This electronic device can include, for example, household electrical appliances such as a washing machine, an air conditioner, or a cooking appliance. Moreover, this electronic device is directly connected to the external network. Alternatively, this electronic device is connected to the external network via, for example, an access point connected to the external network, such as a wireless LAN router.

Figure 1:
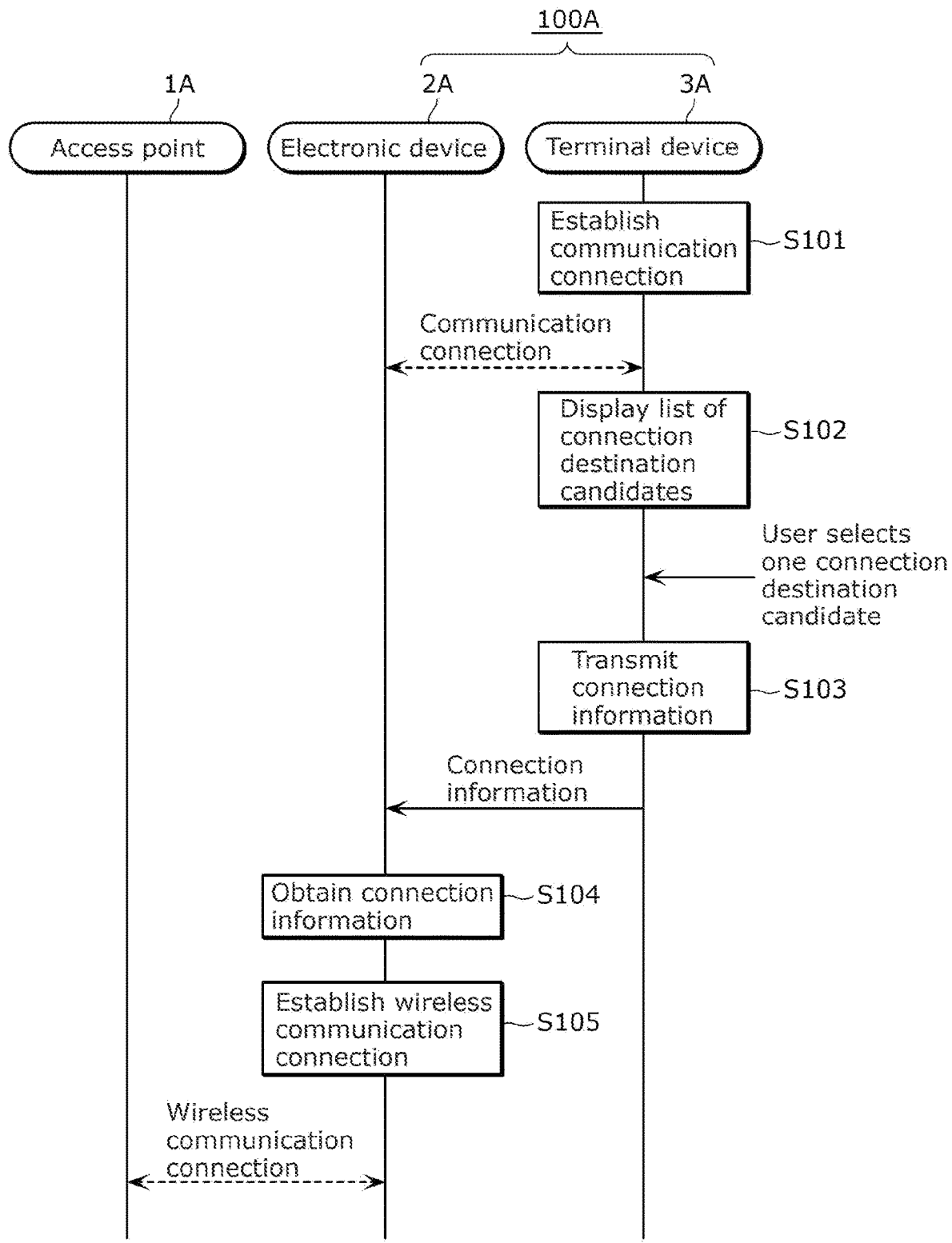
FIG. 1 is a sequence diagram illustrating a behavior of an information processing system in Comparative Example.

Now, a procedure for connecting the above-mentioned electronic device to the external network is described with reference to FIG. 1. FIG. 1 is a sequence diagram illustrating a behavior (information processing method) of information processing system 100A in Comparative Example. Information processing system 100A includes electronic device 2A and terminal device 3A.

Electronic device 2A is, for example, a household electrical appliance, and is a device to be connected to the external network. Electronic device 2A can be connected to the external network via access point 1A by establishing wireless communication connection with access point 1A connected to the external network. Here, it is assumed that electronic device 2A has not established wireless communication connection with the external network yet.

Terminal device 3A is, for example, a smartphone, and is an information processing device owned by a user. Terminal device 3A is communicable with electronic device 2A, and functions as a user interface in place of electronic device 2A at the time of performing a connection action for establishing wireless communication connection between electronic device 2A and access point 1A. That is, description is given here on the assumption that electronic device 2A does not include a user interface for performing the connection action. The following connection action is started by, for example, executing a dedicated application installed on terminal device 3A by the user or performing a particular operation (for example, selecting a particular icon or the like) by the user while the application is executed.

First, the user operates terminal device 3A to thereby establish communication connection between terminal device 3A and electronic device 2A (S101). The communication standard of the communication between electronic device 2A and terminal device 3A is Wi-Fi (registered trademark) or Bluetooth (registered trademark) Low Energy (BLE) as an example, but need not be limited to these communication standards. Electronic device 2A executes the connection process using identification information and security information obtained from terminal device 3A. Consequently, the communication connection between terminal device 3A and electronic device 2A is established, and, after that, terminal device 3A can function as the user interface in place of electronic device 2A. Next, the user operates terminal device 3A to thereby cause a display of terminal device 3A to display a list of one or more connection destination candidates for access point 1A with which terminal device 3A is communicable (S102). The number of the connection destination candidates depends on the number of access points 1A communicable with terminal device 3A, and the number of the connection destination candidates may be one and may be more than one.

Next, if the user operates terminal device 3A to thereby select one connection destination candidate from among the one or more connection destination candidates, terminal device 3A transmits, to electronic device 2A, connection information to be used in the wireless communication connection with access point 1A corresponding to the selected one connection destination candidate (S103). The connection information contains identification information (for example, a service set identifier (SSID)) and security information (for example, a password) of access point 1A corresponding to the selected one connection destination candidate.

Then, if electronic device 2A obtains the connection information from terminal device 3A (S104), electronic device 2A executes the connection process using the connection information, to thereby establish the wireless communication connection with access point 1A (S105). Consequently, electronic device 2A is connected to the external network via access point 1A.

Incidentally, in information processing system 100A in Comparative Example, the one or more connection destination candidates presented to the user are connection destination candidates for access point 1A with which terminal device 3A is communicable. That is, there is a possibility that the one or more connection destination candidates may include a connection destination candidate for access point 1A with which electronic device 2A is not communicable.

As an example, it is assumed that terminal device 3A conforms to frequency bands of both the 2.4 GHz band and the 5 GHz band while electronic device 2A conforms to only the frequency band of the 2.4 GHz band. In this case, the one or more connection destination candidates include both connection destination candidates for the 2.4 GHz band and connection destination candidates for the 5 GHz band. Hence, if the user selects one of the connection destination candidates for the 5 GHz band, the wireless communication connection between access point 1A corresponding to the selected connection destination candidate and electronic device 2A cannot be established, and an error occurs. Accordingly, there arises a problem that, because the error occurs despite the fact that the selected connection destination candidate is presented on the list of the connection destination candidates, there is a possibility that the user may have a feeling of discomfort. Moreover, in this case, also because the user needs to select another connection destination candidate again from the list of the connection destination candidates, there is a possibility that the user may have a feeling of discomfort.

Note that, as a measure to solve the above-mentioned problem, it is conceivable to warn the user to connect in advance access point 1A corresponding to the connection destination candidate for the 2.4 GHz band and terminal device 3A to each other, at the time of performing the connection action. However, this measure is a measure dependent on comprehension or attentiveness of the user. Therefore, for example, such warning makes no sense depending on the comprehension of the user, or the user overlooks such warning depending on the attentiveness of the user, and hence this measure is an inadequate measure.

Under the circumstances, the present inventor has conceived the present disclosure.

Hereinafter, an embodiment will be described in detail with reference to the accompanying Drawings. However, unnecessarily detailed description may be omitted. For example, detailed explanation of a well-known matter and repeated description of substantially identical structures may be omitted. Such omission makes the following description exclude unnecessary redundancy and be easily understood by those skilled in the art.

It should be noted that the accompanying drawings and subsequent description are provided by the inventors of the present invention to facilitate sufficient understanding of the present disclosure by those skilled in the art, and are thus not intended to limit the scope of the subject matter recited in the claims.

EMBODIMENT

[1. Configuration]

Figure 2:
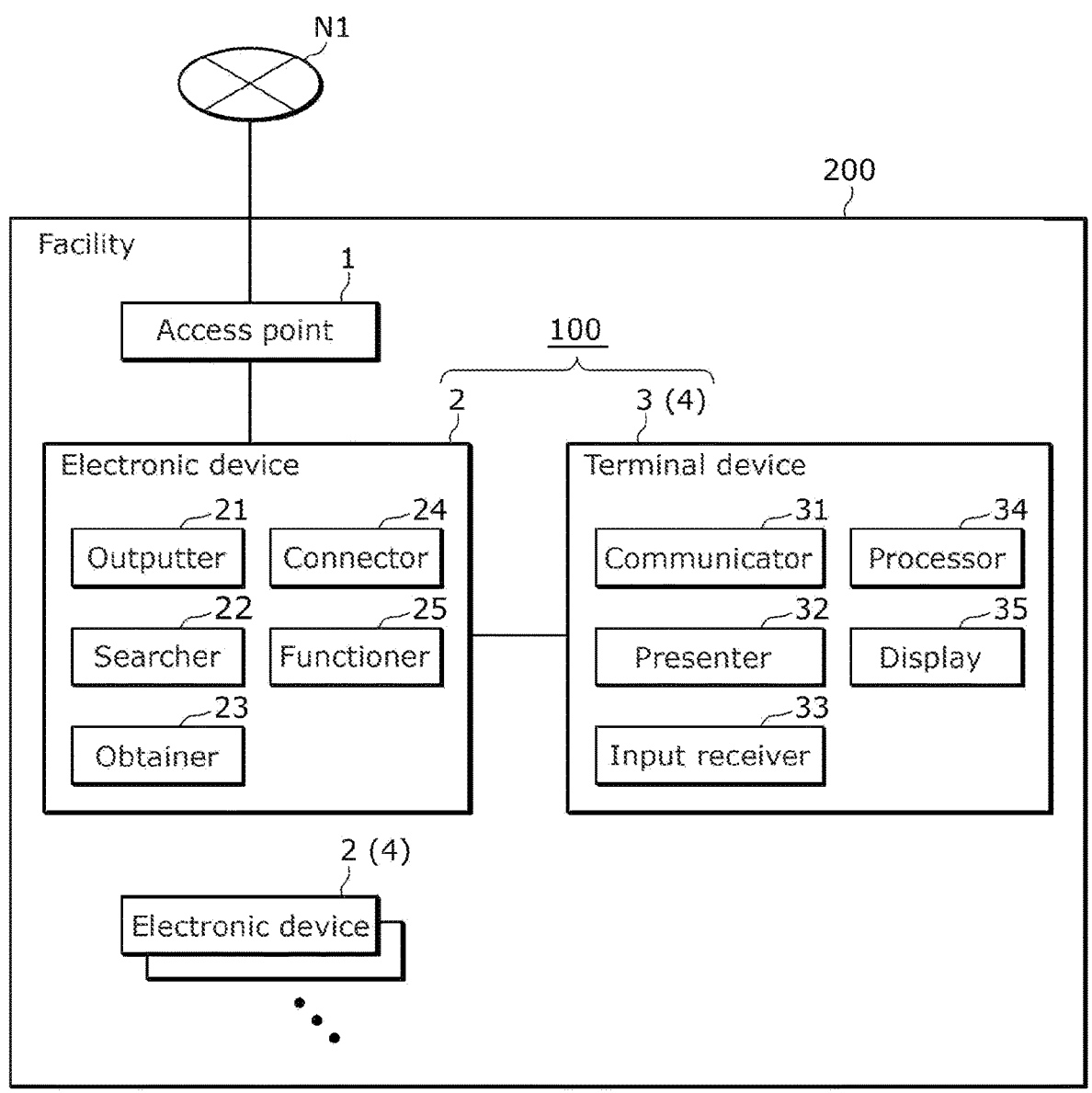
FIG. 2 is a block diagram illustrating a configuration of an information processing system in Embodiment, the information processing system including an electronic device and a terminal device.

FIG. 2 is a block diagram illustrating a configuration of information processing system 100 in Embodiment, information processing system 100 including electronic device 2 and terminal device 3. Information processing system 100 includes electronic device 2 and terminal device 3 including communicator 31 that communicates with electronic device 2. Although a plurality of electronic devices 2 exist in the example illustrated in FIG. 2, description is given below while focusing on one target electronic device 2 of the plurality of electronic devices 2. Accordingly, electronic devices 2 other than target electronic device 2 correspond to other devices 4 different from (target) electronic device 2. Note that, from the point of view of target electronic device 2, terminal device 3 also corresponds to one of other devices 4.

Electronic device 2 is installed in, for example, facility 200 such as a residence. In Embodiment, it is assumed that facility 200 is a residence and the user of terminal device 3 is a resident. Note that facility 200 is not limited to the residence, and may include: residential facilities such as a multiple dwelling house; educational facilities such as an elementary school, a junior high school, a high school, or a university; public facilities such as a community center or a library; stores; or commercial facilities. In addition to electronic device 2, access point 1 is installed in facility 200. In Embodiment, access point 1 is not included in information processing system 100, but may be included therein.

Access point 1 is, for example, a wireless LAN router having a router function, and is connected to, for example, external network N1 such as the Internet. Note that access point 1 need not have the router function, and may be connectable to external network N1 via a router installed separately from access point 1. Access point 1 may be connected to external network N1 by, for example, wired communication using an optical line or the like. Moreover, access point 1 may be connected to external network N1 by, for example, wireless communication using 4th Generation (4G), 5th Generation (5G), or the like.

Electronic device 2 is a device to be connected to external network N1 by establishing wireless communication connection with access point 1. In Embodiment, electronic device 2 is a device that cannot be connected alone to external network N1. That is, in Embodiment, electronic device 2 has a communication function for connecting to external network N1 via access point 1, but does not include a user interface such as a display necessary to perform the connection action for connecting to external network N1. Note that electronic device 2 includes an interface such as a button or a switch for fulfilling its own specific functions, but this interface does not fall under the above-mentioned user interface. Moreover, in Embodiment, electronic device 2 is a device not having a function of transferring a screen for enabling the user to perform the connection action of connecting electronic device 2 to external network N1. That is, in Embodiment, electronic device 2 does not have a function of creating the screen for enabling the user to perform the connection action and transferring the screen to terminal device 3 and a function of reading, out of a memory, the screen for enabling the user to perform the connection action and transferring the screen to terminal device 3.

Further, in Embodiment, electronic device 2 includes, for example, household electrical appliances such as: an air conditioner; an air cleaner; a washing machine; a television receiver; an automatic vacuum cleaner; a video recorder; a refrigerator; or a cooking appliance such as a microwave oven. Note that electronic device 2 may be a device other than a household electrical appliance, for example, a lighting device.

Moreover, electronic device 2 has a function of directly communicating with terminal device 3. In Embodiment, electronic device 2 has a function of wirelessly communicating with terminal device 3. The communication standard of the communication between electronic device 2 and terminal device 3 is Wi-Fi (registered trademark) or Bluetooth (registered trademark) Low Energy (BLE) as an example, but need not be limited to these communication standards. Note that the communication between electronic device 2 and terminal device 3 may be, for example, wired communication established by connecting the two devices using a wired cable.

Electronic device 2 includes outputter 21, searcher 22, obtainer 23, and connector 24. Moreover, electronic device 2 further includes functioner 25 that fulfills a function specific to each electronic device 2. For example, in the case where electronic device 2 is an air conditioner, functioner 25 can fulfill an air conditioning function such as an air cooling operation or an air heating operation. Electronic device 2 includes a processor and a memory, which are not illustrated, and, for example, programs stored in the memory are executed by the processor, whereby respective functions of the above-mentioned elements are fulfilled.

Outputter 21 outputs candidate information regarding candidates for access point 1 to terminal device 3 with which electronic device 2 is communicable, the candidates each having a communication standard to which electronic device 2 conforms. A behavior of outputter 21 is included in part of presenting ST2 in the information processing method. In Embodiment, the communication standard complies with Institute of Electrical and Electronics Engineers (IEEE) 802.11 that is a communication standard of a wireless LAN. Specifically, the communication standard can include IEEE 802.11b, IEEE 802.11g, and IEEE 802.11n for the frequency band of the 2.4 GHz band. Moreover, the communication standard can include IEEE 802.11a, IEEE 802.11n, and IEEE 802.11ac for the frequency band of the 5 GHz band. Note that the communication standard is not limited to the communication standards for the 2.4 GHz band and the 5 GHz band, and may include communication standards for other frequency bands.

The candidate information can contain, for example, one or more connection destination candidates for access point 1 with which electronic device 2 is communicable. In Embodiment, the connection destination candidates are SSIDs (particularly, extended service set identifiers (ES-SIDs)). Hereinafter, even the ESSID is also referred as the "SSID" unless otherwise specified. For example, in the case where the communication standards to which electronic device 2 conforms are only the communication standards for the frequency band of the 2.4 GHz band, the one or more connection destination candidates can include SSIDs of access point 1 that respectively conform to the communication standards for the 2.4 GHz band. In Embodiment, outputter 21 outputs, as the candidate information, search results obtained by searcher 22 to terminal device 3.

Searcher 22 searches for the one or more connection destination candidates as the candidate information. Searcher 22 is a main element that executes searching ST1 in the information processing method. That is, in searching ST1, electronic device 2 (searcher 22) searches for the one or more connection destination candidates as the candidate information prior to presenting ST2 (before outputter 21 outputs the candidate information).

Specifically, access point 1 regularly sends radio waves that comply with the communication standard to which access point 1 conforms. Searcher 22 executes a reception process of the radio waves, and, in the case where the radio waves sent by access point 1 can be received, searcher 22 adds a SSID corresponding to the radio waves to the connection destination candidates. For example, in the case where electronic device 2 conforms to the three communication standards of IEEE 802.11b, IEEE 802.11g, and IEEE 802.11n for the 2.4 GHz band, searcher 22 searches for three SSIDs of access point 1 that respectively conform to the three communication standards, as the one or more connection destination candidates.

Obtainer 23 obtains, from terminal device 3, connection information to be used in the wireless communication connection with access point 1 corresponding to one connection destination candidate selected by the user using terminal device 3 from the one or more connection destination candidates based on the candidate information. Obtainer 23 is a main element that executes obtaining ST3 in the information processing method.

Although detailed description is given later, an operation of selecting, by the user, one connection destination candidate (SSID) from among the one or more connection destination candidates (SSID) is performed in terminal device 3. Consequently, terminal device 3 transmits, to electronic device 2, the connection information containing: the one connection destination candidate (SSID); and security information (password) corresponding to the one connection destination candidate (SSID). Obtainer 23 receives the connection information transmitted from terminal device 3, to thereby obtain the connection information corresponding to the one connection destination candidate selected by the user.

Connector 24 establishes the wireless communication connection with access point 1 corresponding to the one connection destination candidate with reference to the connection information obtained by obtainer 23 (obtained in obtaining ST3). Connector 24 is a main element that executes connecting ST4 in the information processing method. For example, in the case where the one connection destination candidate is a SSID of access point 1 corresponding to IEEE 802.11b, connector 24 executes a connection process using the SSID and a password corresponding to the SSID, to thereby establish the wireless communication connection between electronic device 2 and access point 1. Consequently, electronic device 2 is connected to external network N1 via access point 1 thereafter.

Terminal device 3 is, for example, a mobile terminal such as a smartphone or a tablet terminal, and is a device owned by the user. Note that terminal device 3 may be a desktop personal computer, a laptop personal computer, or the like. In Embodiment, terminal device 3 is a smartphone.

Terminal device 3 includes communicator 31, presenter 32, input receiver 33, processor 34, and display 35. Terminal device 3 includes a processor and a memory, which are not illustrated, and, for example, programs stored in the memory are executed by the processor, whereby respective functions of the above-mentioned elements are fulfilled.

Communicator 31 communicates with electronic device 2. Specifically, communicator 31 has a function of directly wirelessly communicating with electronic device 2 without the intermediation of external network N1. As has already been described, the communication standard of the communication between communicator 31 and electronic device 2 is Wi-Fi (registered trademark) or Bluetooth (registered trademark) Low Energy (BLE) as an example, but need not be limited to these communication standards. Moreover, the communication between communicator 31 and electronic device 2 may be, for example, wired communication established by connecting the two devices using a wired cable.

Note that, in Embodiment, communicator 31 may establish the wireless communication connection with access point 1, and need not establish the wireless communication connection therewith.

Presenter 32 presents the candidate information obtained from electronic device 2. A behavior of presenter 32 is included in part of presenting ST2 in the information processing method. That is, the behavior of outputter 21 of electronic device 2 and the behavior of presenter 32 of terminal device 3 correspond to presenting ST2. As has already been described, in Embodiment, outputter 21 of electronic device 2 outputs, as the candidate information, the one or more connection destination candidates that are the search results obtained by searcher 22. Accordingly, presenter 32 causes display 35 to display the list of the one or more connection destination candidates obtained from electronic device 2, to thereby present the candidate information to the user.

Figure 3A:
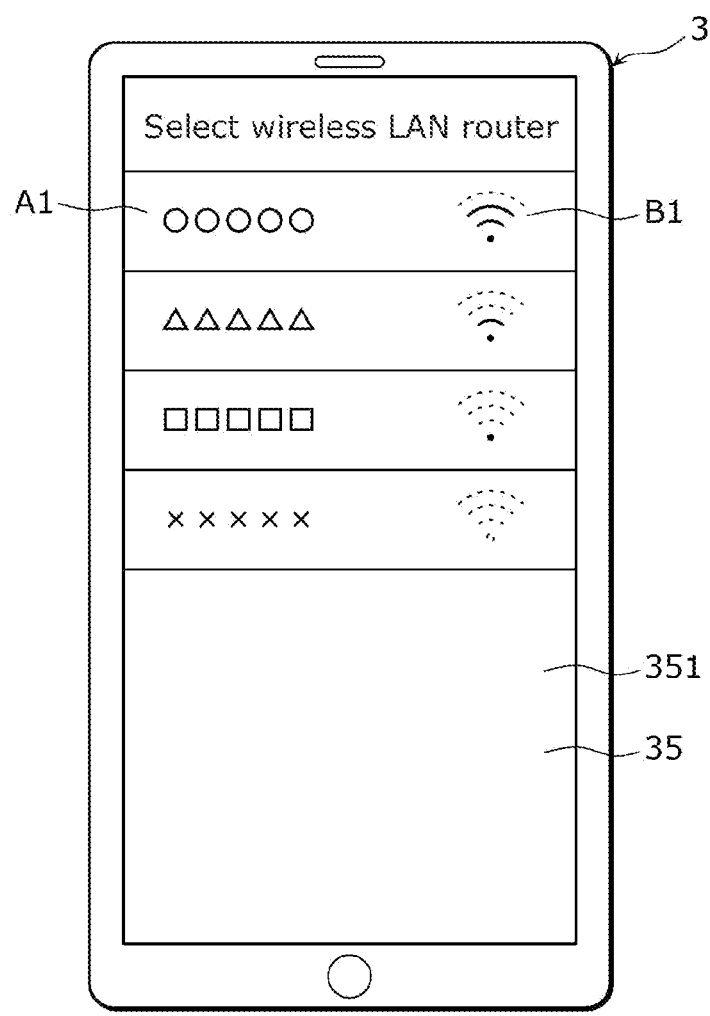
FIG. 3A is a diagram illustrating a list screen of connection destination candidates that is displayed by the terminal device in Embodiment.

FIG. 3A is a diagram illustrating list screen 351 of the connection destination candidates that is displayed by terminal device 3 in Embodiment. In the case where the number of the connection destination candidates obtained from electronic device 2 is more than one, presenter 32 causes display 35 to display list screen 351 as illustrated in FIG. 3A. In the example illustrated in FIG. 3A, four connection destination candidates are displayed separately in four rows on list screen 351. In each row, character string A1 indicating a connection destination candidate (SSID) and first icon B1 indicating the reception strength of radio waves corresponding to the connection destination candidate are displayed next to each other in a lateral direction. Note that the number of characters of character string A1 illustrated in FIG. 3A does not represent the number of characters of the actual SSID.

Input receiver 33 receives an input of the user for selecting one connection destination candidate. In Embodiment, as described later, display 35 is configured by a touch panel, and hence input receiver 33 receives a touch operation, a slide operation, or the like that is performed on display 35 by the user, as the input of the user. For example, in the state where list screen 351 illustrated in FIG. 3A is displayed on display 35, the user can select the one connection destination candidate by performing the touch operation on character string A1 indicating any of the connection destination candidates (SSIDs).

Figure 3B:
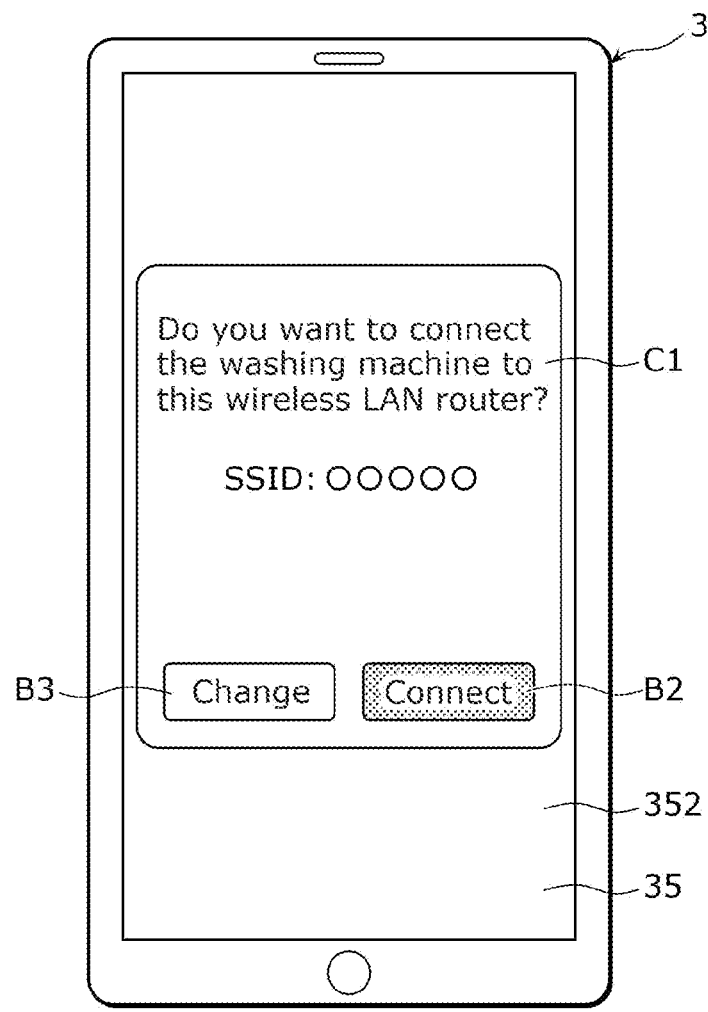
FIG. 3B is a diagram illustrating a confirmation screen that is displayed by the terminal device in Embodiment.

FIG. 3B is a diagram illustrating confirmation screen 352 that is displayed by terminal device 3 in Embodiment. When the user selects the one connection destination candidate, confirmation screen 352 is displayed on display 35. Note that, in the case where the number of the connection destination candidates obtained from electronic device 2 is one, confirmation screen 352 is displayed on display 35 without the selection of the one connection destination candidate by the user. In this case, presenter 32 does not cause display 35 to display list screen 351.

Figure 4:
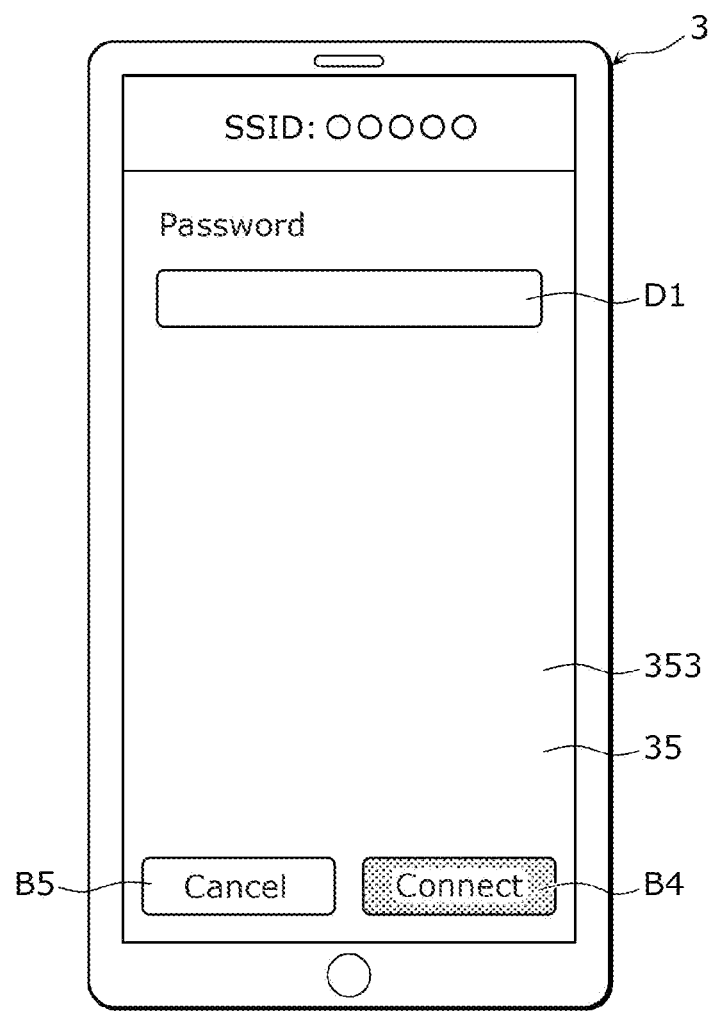
FIG. 4 is a diagram illustrating an input reception screen of a password that is displayed by the terminal device in Embodiment.

In the example illustrated in FIG. 3B, displayed are: message C1 for confirming with the user whether electronic device 2 (here, a washing machine) is connected to access point 1 (here, a wireless LAN router) corresponding to the one connection destination candidate; second icon B2 including a character string of "Connect"; and third icon B3 including a character string of "Change". If the user selects second icon B2, input reception screen 353 illustrated in FIG. 4 is displayed on display 35. On the other hand, if the user selects third icon B3, list screen 351 is displayed again on display 35.

Note that, in the case where the number of the connection destination candidates obtained from electronic device 2 is one, the character string of third icon B3 on confirmation screen 352 is changed to, for example, a character string of "Cancel". In this case, if the user selects third icon B3, the connection action by the user for establishing the wireless communication connection between electronic device 2 and access point 1 is ended in an uncompleted state.

FIG. 4 is a diagram illustrating input reception screen 353 of a password that is displayed by terminal device 3 in Embodiment. In the example illustrated in FIG. 4, displayed on input reception screen 353 are: text box D1 for inputting the password; fourth icon B4 including a character string of "Connect"; and fifth icon B5 including a character string of "Cancel". If the user inputs the password corresponding to the selected one connection destination candidate (SSID) to text box D1 and then selects fourth icon B4, the connection action by the user is completed and ended. On the other hand, if the user selects fifth icon B5, the connection action by the user is ended in an uncompleted state.

Here, the connection action by the user is described by giving a first connection example to a fifth connection example below.

In the first connection example, list screen 351 as illustrated in FIG. 3A is first displayed on display 35 of terminal device 3. If the user selects one connection destination candidate from the plurality of connection destination candidates displayed on list screen 351, confirmation screen 352 as illustrated in FIG. 3B is then displayed on display 35. If the user selects second icon B2 on confirmation screen 352, input reception screen 353 as illustrated in FIG. 4 is then displayed on display 35. If the user inputs the password corresponding to the selected one connection destination candidate to text box D1 on input reception screen 353 and selects fourth icon B4, the connection action by the user is completed.

In the second connection example, list screen 351 as illustrated in FIG. 3A is first displayed on display 35 of terminal device 3. If the user selects one connection destination candidate from the plurality of connection destination candidates displayed on list screen 351, input reception screen 353 as illustrated in FIG. 4 is then displayed on display 35. That is, in the second connection example, the process of confirming with the user is omitted. If the user inputs the password corresponding to the selected one connection destination candidate to text box D1 on input reception screen 353 and selects fourth icon B4, the connection action by the user is completed.

In the third connection example, confirmation screen 352 as illustrated in FIG. 3B is first displayed on display 35 of terminal device 3. That is, in the third connection example, the number of the connection destination candidates is one, and the process of selecting, by the user, one connection destination candidate from the plurality of connection destination candidates is omitted. If the user selects second icon B2 on confirmation screen 352, input reception screen 353 as illustrated in FIG. 4 is then displayed on display 35. If the user inputs the password corresponding to the selected one connection destination candidate to text box D1 on input reception screen 353 and selects fourth icon B4, the connection action by the user is completed.

In the fourth connection example, confirmation screen 352 as illustrated in FIG. 3B is first displayed on display 35 of terminal device 3. That is, in the fourth connection example, similarly to the third connection example, the number of the connection destination candidates is one, and the process of selecting, by the user, one connection destination candidate from the plurality of connection destination candidates is omitted. If the user selects second icon B2 on confirmation screen 352, the connection action by the user is completed. That is, in the fourth connection example, terminal device 3 has already stored therein the password corresponding to the one connection destination candidate, and the process of inputting, by the user, the password corresponding to the one connection destination candidate is omitted.

In the fifth connection example, list screen 351 as illustrated in FIG. 3A is first displayed on display 35 of terminal device 3. If the user selects one connection destination candidate from the plurality of connection destination candidates displayed on list screen 351, the connection action by the user is completed. That is, in the fifth connection example, the encryption scheme is open for all the plurality of connection destination candidates, the need to input the password is eliminated, the process of confirming with the user is omitted, and the process of inputting, by the user, the password corresponding to the selected one connection destination candidate is omitted.

Processor 34 transmits, to electronic device 2 via communicator 31, the connection information to be used in the wireless communication connection with access point 1 corresponding to the one connection destination candidate received by input receiver 33. As has already been described, the connection information contains: the one connection destination candidate (SSID) received by input receiver 33; and the security information (password) corresponding to the one connection destination candidate (SSID). In the case where input receiver 33 receives an input of the password by the user, processor 34 adds the received password to the security information contained in the connection information. Note that, in the case where the password corresponding to the one connection destination candidate selected by the user has already been stored in the memory of terminal device 3, processor 34 reads the password out of the memory, and adds the read-out password to the security information contained in the connection information. In this case, input reception screen 353 is not displayed on display 35.

Display 35 is, for example, a display configured by a liquid crystal panel or an organic electro-luminescence (EL) panel. For example, above-mentioned list screen 351, confirmation screen 352, or input reception screen 353 is displayed on display 35. Moreover, display 35 is a touch panel as has already been described, and doubles as an interface that receives an operation input of the user, that is, also functions as input receiver 33.

[2. Behavior]

A behavior (information processing method) of information processing system 100 configured as described above is described below with reference to FIG. 5. FIG. 5 is a sequence diagram illustrating a behavior example of information processing system 100 in Embodiment. The following connection action is started by, for example, executing a dedicated application installed on terminal device 3 by the user or performing a particular operation (for example, selecting a particular icon or the like) by the user while the application is executed.

First, the user operates terminal device 3 to thereby establish the communication connection between terminal device 3 and electronic device 2 (S1). Electronic device 2 executes the connection process using identification information and security information obtained from terminal device 3. Consequently, the communication connection between terminal device 3 and electronic device 2 is established, and, after that, terminal device 3 can function as the user interface in place of electronic device 2.

Next, searcher 22 of electronic device 2 searches for one or more connection destination candidates (S2). Process S2 corresponds to searching ST1. For example, process S2 may be automatically executed when the communication connection between electronic device 2 and terminal device 3 is established, and may be executed in response to a command from terminal device 3. In the latter case, the command is transmitted to electronic device 2 by operating terminal device 3 by the user. Then, outputter 21 of electronic device 2 transmits, to terminal device 3, candidate information containing the one or more connection destination candidates searched for by searcher 22 (S3). Process S3 is included in presenting ST2.

In terminal device 3, communicator 31 receives the candidate information to thereby obtain the candidate information (S4). Process S4 is included in presenting ST2. Then, presenter 32 of terminal device 3 causes display 35 to display a list of the one or more connection destination candidates obtained from electronic device 2, to thereby present the candidate information to the user (S5). Process S5 is included in presenting ST2.

Next, if the user operates terminal device 3 to thereby select one connection destination candidate from among the one or more connection destination candidates, processor 34 of terminal device 3 transmits, to electronic device 2 via communicator 31, connection information to be used in the wireless communication connection with access point 1 corresponding to the selected one connection destination candidate (S6). The connection information contains identification information (here, a SSID) and security information (here, a password) of access point 1 corresponding to the selected one connection destination candidate.

Here, the action performed by operating terminal device 3 by the user is the connection action in any connection example of the above-mentioned first connection example to the above-mentioned fifth connection example. For example, in the case of the second connection example, according to process S5, list screen 351 as illustrated in FIG. 3A is displayed on display 35 of terminal device 3. If the user operates terminal device 3 to thereby select one connection destination candidate from the plurality of connection destination candidates displayed on list screen 351, input reception screen 353 as illustrated in FIG. 4 is then displayed on display 35. That is, in the second connection example, the process of confirming with the user is omitted. The user inputs the password corresponding to the selected one connection destination candidate to text box D1 on input reception screen 353 and selects fourth icon B4.

Consequently, the connection action by the user in the second connection example is completed. Processor 34 of terminal device 3 transmits, to electronic device 2 via communicator 31, the connection information containing: the SSID of access point 1 corresponding to the one connection destination candidate selected in the above-mentioned connection action; and the password input in the above-mentioned connection action, to thereby execute process S6.

Moreover, for example, in the case of the third connection example, according to process S5, confirmation screen 352 as illustrated in FIG. 3B is displayed on display 35 of terminal device 3. That is, in the third connection example, the number of the connection destination candidates is one, and the process of selecting, by the user, one connection destination candidate from the plurality of connection destination candidates is omitted. If the user operates terminal device 3 to thereby select second icon B2 on confirmation screen 352, input reception screen 353 as illustrated in FIG. 4 is then displayed on display 35. The user inputs the password corresponding to the selected one connection destination candidate to text box D1 on input reception screen 353 and selects fourth icon B4.

Consequently, the connection action by the user in the third connection example is completed. Processor 34 of terminal device 3 transmits, to electronic device 2 via communicator 31, the connection information containing: the SSID of access point 1 corresponding to the one connection destination candidate selected in the above-mentioned connection action; and the password input in the above-mentioned connection action, to thereby execute process S6.

Moreover, for example, in the case of the fourth connection example, according to process S5, confirmation screen 352 as illustrated in FIG. 3B is displayed on display 35 of terminal device 3. That is, in the fourth connection example, similarly to the third connection example, the number of the connection destination candidates is one, and the process of selecting, by the user, one connection destination candidate from the plurality of connection destination candidates is omitted. If the user operates terminal device 3 to thereby select second icon B2 on confirmation screen 352, the connection action by the user is completed. That is, in the fourth connection example, terminal device 3 has already stored therein the password corresponding to the one connection destination candidate, and the process of inputting, by the user, the password corresponding to the one connection destination candidate is omitted.

Processor 34 of terminal device 3 transmits, to electronic device 2 via communicator 31, the connection information containing: the SSID of access point 1 corresponding to the one connection destination candidate selected in the above-mentioned connection action; and the stored password, to thereby execute process S6.

Obtainer 23 of electronic device 2 receives the connection information transmitted from terminal device 3, to thereby obtain the connection information (S7). Process S7 corresponds to obtaining ST3. Then, connector 24 of electronic device 2 executes the connection process using the connection information obtained by obtainer 23, to thereby establish the wireless communication connection with access point 1 (S8). Process S8 corresponds to connecting ST4. Consequently, electronic device 2 is connected to external network N1 via access point 1.

[3. Effects and the Like]

Now, advantages of information processing system 100 (information processing method) in Embodiment are described.

As has already been described, in information processing system 100A (information processing method) in Comparative Example, the one or more connection destination candidates presented to the user are connection destination candidates for access point 1A with which terminal device 3A is communicable, and can include a connection destination candidate for access point 1A with which electronic device 2A is not communicable. Therefore, in information processing system 100A in Comparative Example, the wireless communication connection between access point 1A and electronic device 2A cannot be established depending on the connection destination candidate selected by the user, and an error can occur. Then, there arises a problem that, because the error occurs despite the fact that the selected connection destination candidate is presented on the list of the connection destination candidates, there is a possibility that the user may have a feeling of discomfort.

In comparison with this, in information processing system 100 (information processing method) in Embodiment, the one or more connection destination candidates presented to the user are connection destination candidates for access point 1 with which electronic device 2 is communicable, and do not include a connection destination candidate for access point 1 with which electronic device 2 is not communicable. Therefore, in information processing system 100 in Embodiment, the error as described above is less likely to occur, and hence the user is less likely to have a feeling of discomfort. That is, information processing system 100 in Embodiment has an advantage that electronic device 2 is more easily connected to external network N1 without the occurrence of an event that gives a feeling of discomfort to the user, such as the error.

(Variations)

As described hereinabove, Embodiment is given as an example of a technique disclosed by the present application. However, the technique in the present disclosure is not limited thereto, and can also be applied to embodiments on which change, replacement, addition, omission, and the like are made as appropriate. Moreover, a new embodiment can be configured by combining constituent elements described in above-mentioned Embodiment.

In view of this, Variations of Embodiment are described below.

In above-mentioned Embodiment, access point 1 may be a repeater different from the wireless LAN router. For example, access point 1 may be a peripheral of Bluetooth (registered trademark) Low Energy (BLE). In this case, the communication standard of the communication between access point 1 and electronic device 2 may be a communication standard that complies with Bluetooth (registered trademark) Low Energy (BLE). Moreover, in this case, the connection information may contain, as the security information, a passkey of Bluetooth (registered trademark) Low Energy (BLE) in place of the password.

In above-mentioned Embodiment, when another device 4 different from electronic device 2 has already established the wireless communication connection with access point 1, presenter 32 (in presenting ST2) may preferentially present a connection destination candidate (hereinafter, referred to as a "preferential candidate") corresponding to this access point 1. For example, another device 4 is terminal device 3. Moreover, for example, another device 4 is another electronic device 2.

Specifically, at the time of causing display 35 to display list screen 351, presenter 32 preferentially presents the preferential candidate by: displaying the preferential candidate in an uppermost part of the screen; or changing fonts of a character string and the like corresponding to the preferential candidate to thereby highlight the preferential candidate.

In this case, there is an advantage that, for example, if the user selects the preferential candidate as the one connection destination candidate, because terminal device 3 can use, as the connection information, the information used to establish the wireless communication connection between another device 4 and access point 1, the process of establishing the wireless communication connection between electronic device 2 and access point 1 is more easily executed. Moreover, in this case, there is another advantage that, because the trouble that the user inputs the security information (here, the password) is saved, the connection action is facilitated.

In above-mentioned Embodiment, electronic device 2 is a device that cannot be connected alone to external network N1, but the present disclosure is not limited thereto. For example, electronic device 2 may be a device that includes a user interface such as a display necessary to perform the connection action for connecting to external network N1 and thus can be connected alone to external network N1. Even in this case, there is an advantage that, because the connection action can be performed in a place away from electronic device 2 by using information processing system 100 (information processing method) in Embodiment, the trouble of going to the place in which electronic device 2 is installed is saved.

In above-mentioned Embodiment, electronic device 2 executes searching ST1 to thereby search for the one or more connection destination candidates with which electronic device 2 is communicable, but the present disclosure is not limited thereto. For example, electronic device 2 may output information indicating the communication standard using which electronic device 2 is communicable, as the candidate information to terminal device 3. In this case, terminal device 3 that has obtained the candidate information presents, to the user, one or more connection destination candidates with which terminal device 3 is communicable and with which electronic device 2 is communicable based on the candidate information. For example, it is assumed that electronic device 2 outputs the candidate information that electronic device 2 is communicable only at the frequency of the 2.4 GHz band, as the candidate information to terminal device 3. In this case, terminal device 3 presents, to the user, only connection destination candidates that conform to the frequency band of the 2.4 GHz band, among connection destination candidates that conform to the frequency bands of both the 2.4 GHz band and the 5 GHz band using which terminal device 3 is communicable. In the above-mentioned aspect, searching ST1 is not necessary.

In the above-described embodiment, electronic device 2 may be distributed on market as a single device, not as one of the constituent elements of information processing system 100. Likewise, in the above-described embodiment, terminal device 3 may be distributed on market as a single device, not as one of the constituent elements of information processing system 100.

It should be noted in the above-described embodiment that a part of all of the constituent elements included in information processing system 100 according to the present disclosure may be implemented to a dedicated hardware, or implemented by executing a software program suitable for each of the constituent elements. Each of the constituent elements may be implemented when a program executer, such as a central processing unit (CPU) or a processor, reads a software program from a recording medium, such as a Hard Disk Drive (HDD) or a semiconductor memory, and executes the readout software program.

It should also be noted that the constituent elements included in information processing system 100 according to the present disclosure may be implemented to one or more electronic circuits. Each of the one or more electronic circuits may be a general-purpose circuit or a dedicated circuit.

The one or more electronic circuits may include, for example, a semiconductor device, an Integrated Circuit (IC) or a Large Scale Integration (LSI). The IC or LSI may be integrated to a single chip or integrated to a plurality of chips. Note that here, the terminology "LSI" or "IC" is used, but depending on the degree of integration, the circuit may also be referred to as a system LSI, a very large scale integration (VLSI), or an ultra large scale integration (ULSI). A field programmable gate array (FPGA) that is programed after manufacturing the LSI may be used for the same purpose.

It should be noted that general or specific aspects of the present disclosure may be implemented to a system, a device, a method, an integrated circuit, or a computer program. The general or specific aspects of the present disclosure may be implemented to a non-transitory computer-readable recording medium such as an optical disk, a Hard Disk Drive (HDD), or a semiconductor memory, on which the computer program is recorded. For example, the present disclosure may be implemented to a program that causes a computer to execute the information processing method according to the above-described embodiment. Furthermore, the program may be recorded on a non-transitory computer-readable recording medium, such as a Compact Disc-Read Only Memory (CD-ROM), or may be distributed via a communication path, such as the Internet.

Thus, the embodiment has been described as an example of the technique according to the present disclosure. The accompanying drawings and the detailed description are therefore given.

Therefore, in order to provide the examples of the technique, among the constituent elements illustrated in the accompanying drawings and described in the detailed description, there may be constituent elements not essential to solve the problem as well as essential constituent elements. It is therefore not reasonable to easily consider these unessential constituent elements as essential merely because the elements are illustrated in the accompanying drawings or described in the detailed description.

The above-described embodiment is an example of the technique in the present disclosure, and thus various modifications, substitutions, additions, and omissions are possible in the scope of the claims and equivalent scopes thereof.

(Overview)

As described above, the information processing method according to Embodiment is an information processing method of connecting electronic device 2 to external network N1 by establishing wireless communication connection between electronic device 2 and access point 1 connected to external network N1. The information processing method includes presenting step ST2, obtaining step ST3, and connecting step ST4. Presenting step ST2 is a step of presenting candidate information regarding one or more candidates for access point 1 to a user via terminal device 3 communicable with electronic device 2. Each of the one or more candidates has a communication standard to which electronic device 2 conforms. Obtaining step ST3 is a step of obtaining, from terminal device 3, connection information to be used in wireless communication connection with access point 1 corresponding to one connection destination candidate selected by the user using terminal device 3 from one or more connection destination candidates based on the candidate information. Connecting step ST4 is a step of establishing the wireless communication connection with access point 1 corresponding to the one connection destination candidate with reference to the connection information obtained in obtaining ST3.

According to this configuration, there is an advantage that electronic device 2 is more easily connected to external network N1 without the occurrence of an event that gives a feeling of discomfort to the user, such as an error.

Furthermore, for example, the information processing method further includes searching step ST1. Searching step ST1 is a step of searching for the one or more connection destination candidates as the candidate information, by electronic device 2, prior to presenting step ST2.

According to this configuration, there is an advantage that the connection destination candidates with which electronic device 2 can establish the wireless communication connection are more easily presented to the user with higher accuracy.

Moreover, for example, in the information processing method, electronic device 2 is a device that cannot be connected alone to external network N1.

According to this configuration, there is an advantage that, because electronic device 2 need not include a user interface such as a display necessary to perform the connection action for connecting to external network N1, manufacturing costs of electronic device 2 are more easily reduced.

Moreover, for example, in the information processing method, electronic device 2 is a device not having a function of transferring a screen for enabling the user to perform the connection action of connecting electronic device 2 to external network N1.

According to this configuration, there is an advantage that, because electronic device 2 need not include a user interface such as a display necessary to perform the connection action for connecting to external network N1, manufacturing costs of electronic device 2 are more easily reduced.

Moreover, for example, in the information processing method, electronic device 2 is a household electrical appliance.

According to this configuration, there is an advantage that, because the household electrical appliance need not include a user interface such as a display necessary to perform the connection action for connecting to external network N1, manufacturing costs of the household electrical appliance are more easily reduced.

Furthermore, for example, in the information processing method, in presenting step ST2, when other device 4 different from electronic device 2 has already established wireless communication connection with access point 1, a connection destination candidate corresponding to access point 1 is preferentially presented.

Furthermore, for example, in the information processing method, other device 4 is terminal device 3.

Furthermore, for example, in the information processing method, other device 4 is another electronic device 2.

According to this configuration, there is an advantage that, for example, if the user selects the preferential candidate as the one connection destination candidate, because terminal device 3 can use, as the connection information, the information used to establish the wireless communication connection between another device 4 (terminal device 3 or another electronic device 2) and access point 1, the process of establishing the wireless communication connection between electronic device 2 and access point 1 is more easily executed.

Furthermore, for example, in the information processing method, presenting step ST2 includes: obtaining, as the candidate information, information that is outputted from electronic device 2 and indicates the communication standard to which electronic device 2 conforms; and presenting, to the user, the one or more connection destination candidates with which each of terminal device 3 and electronic device 2 is communicable. The one or more connection destination candidates are based on the obtained candidate information.

According to this configuration, there is an advantage that, because the trouble of executing the process of searching for the one or more connection destination candidates as the candidate information, by electronic device 2, is saved, a processing load of electronic device 2 can be reduced.

Furthermore, the program according to Embodiment causes one or more processors to execute the above-described information processing method.

According to this configuration, there is an advantage that electronic device 2 is more easily connected to external network N1 without the occurrence of an event that gives a feeling of discomfort to the user, such as an error.

Electronic device 2 according to Embodiment is electronic device 2 to be connected with external network N1 by establishing wireless communication connection with access point 1 connected to external network N1. Electronic device 2 includes outputter 21, obtainer 23, and connector 24. Outputter 21 outputs candidate information regarding one or more candidates for access point 1 to terminal device 3 with which electronic device 2 is communicable. Each of the one or more candidates has a communication standard to which electronic device 2 conforms. Obtainer 23 obtains, from terminal device 3, connection information to be used in wireless communication connection with access point 1 corresponding to one connection destination candidate selected by the user using terminal device 3 from one or more connection destination candidates based on the candidate information. Connector 24 establishes the wireless communication connection with access point 1 corresponding to the one connection destination candidate with reference to the connection information obtained by obtainer 23.

According to this configuration, there is an advantage that electronic device 2 is more easily connected to external network N1 without the occurrence of an event that gives a feeling of discomfort to the user, such as an error.

Furthermore, information processing system 100 according to Embodiment includes: above-described electronic device 2; and terminal device 3 including communicator 31 that communicates with above-described electronic device 2.

According to this configuration, there is an advantage that electronic device 2 is more easily connected to external network N1 without the occurrence of an event that gives a feeling of discomfort to the user, such as an error.

Furthermore, terminal device 3 according to Embodiment includes communicator 31, presenter 32, input receiver 33, and processor 34. Communicator 31 communicates with above-described electronic device 2. Presenter 32 presents the candidate information obtained from electronic device 2. Input receiver 33 receives an input of the user for selecting the one connection destination candidate. Processor 34 transmits the connection information to electronic device 2 via communicator 31, the connection information being used in wireless communication connection with access point 1 corresponding to the one connection destination candidate received by input receiver 33. When other device 4 different from electronic device 2 has already established wireless communication connection with access point 1, presenter 34 preferentially presents a connection destination candidate corresponding to access point 1.

According to this configuration, there is an advantage that electronic device 2 is more easily connected to external network N1 without the occurrence of an event that gives a feeling of discomfort to the user, such as an error.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The present disclosure is applicable to an information processing system and the like used to connect an electronic device to an external network.

The invention claimed is:

1. An information processing method of connecting an electronic device to an external network by establishing wireless communication connection between the electronic device and an access point connected to the external network, the information processing method comprising:
    presenting candidate information regarding one or more candidates for the access point to a user via a terminal device communicable with the electronic device, the one or more candidates each having a communication standard to which the electronic device conforms;
    obtaining, from the terminal device, connection information to be used in wireless communication connection with an access point corresponding to one connection destination candidate selected by the user using the terminal device from one or more connection destination candidates based on the candidate information; and
    establishing the wireless communication connection with the access point corresponding to the one connection destination candidate with reference to the connection information obtained in the obtaining,
    wherein the presenting includes:
    obtaining, as the candidate information, information that is outputted from the electronic device and indicates the communication standard to which the electronic device conforms; and
    presenting, to the user, the one or more connection destination candidates with which each of the terminal device and the electronic device is communicable, the one or more connection destination candidates being based on the candidate information obtained in the obtaining.

2. The information processing method according to claim 1, further comprising:
searching for the one or more connection destination candidates as the candidate information, by the electronic device, prior to the presenting.

3. The information processing method according to claim 1, wherein
in the presenting, when an other device different from the electronic device has already established wireless communication 35 connection with an access point, a connection destination candidate corresponding to the access point is preferentially presented.

4. The information processing method according to claim 3, wherein
the other device is the terminal device.

5. The information processing method according to claim 3, wherein
the other device is another electronic device.

6. A non-transitory computer-readable recording medium having recorded thereon a program for causing one or more processors to execute the information processing method according to claim 1.

7. An electronic device to be connected with an external network by establishing wireless communication connection with an access 35 point connected to the external network, the electronic device comprising:
an outputter that outputs candidate information regarding one or more candidates for the access point to a terminal device with which the electronic device is communicable, the one or more candidates each having a communication standard to which the electronic device conforms;
an obtainer that obtains, from the terminal device, connection information to be used in wireless communication connection with the access point corresponding to one connection destination candidate selected by the user using the terminal device from one or more connection destination candidates based on the candidate information; and
a connector that establishes the wireless communication connection with the access point corresponding to the one connection destination candidate with reference to the connection information obtained by the obtainer,
wherein the outputter obtains, as the candidate information, information that is outputted from the electronic device and indicates the communication standard to which the electronic device conforms; and presents, to the user, the one or more connection destination candidates with which each of the terminal device and the electronic device is communicable, the one or more connection destination candidates being based on the candidate information obtained by the obtainer.

8. An information processing system comprising:

the electronic device according to claim 7; and the terminal device including a communicator that communicates with the electronic device.

* * * * *